US 9,109,756 B2

(12) United States Patent
Eisenbrandt

(10) Patent No.: US 9,109,756 B2
(45) Date of Patent: Aug. 18, 2015

(54) PUMP SYSTEM FOR FOOD MACHINE

(71) Applicant: Formax, Inc.

(72) Inventor: John Eisenbrandt, Manhattan, IL (US)

(73) Assignee: FORMAX, INC., Mokena, IL (US)

( * ) Notice: Subject to any disclaimer, the term of this patent is extended or adjusted under 35 U.S.C. 154(b) by 227 days.

(21) Appl. No.: 13/739,592

(22) Filed: Jan. 11, 2013

(65) Prior Publication Data
US 2013/0248026 A1    Sep. 26, 2013

Related U.S. Application Data

(60) Provisional application No. 61/586,481, filed on Jan. 13, 2012.

(51) Int. Cl.
| F04B 17/00 | (2006.01) |
| F17D 1/00 | (2006.01) |
| A22C 7/00 | (2006.01) |
| A22C 11/08 | (2006.01) |
| F04B 15/02 | (2006.01) |
| B23P 15/00 | (2006.01) |
| F04B 7/00 | (2006.01) |

(52) U.S. Cl.
CPC .............. F17D 1/00 (2013.01); A22C 7/0023 (2013.01); A22C 11/08 (2013.01); B23P 15/001 (2013.01); F04B 15/023 (2013.01); F04B 7/0026 (2013.01); Y10T 29/53596 (2015.01); Y10T 137/85978 (2015.04)

(58) Field of Classification Search
CPC .............................. F04B 15/023; F04B 7/0026
USPC .................... 417/362, 532; 137/876, 624.47
See application file for complete search history.

(56) References Cited

U.S. PATENT DOCUMENTS

| 2,882,591 A | | 4/1959 | Grossman | |
| 3,208,388 A | * | 9/1965 | Glasgow | 417/362 |
| 3,741,691 A | * | 6/1973 | Schwing | 417/517 |
| 3,887,964 A | | 6/1975 | Richards | |
| 4,089,624 A | * | 5/1978 | Nichols et al. | 417/362 |
| RE30,096 E | | 9/1979 | Richards | |
| 4,356,595 A | | 11/1982 | Sandberg et al. | |
| 4,372,008 A | | 2/1983 | Sandberg | |
| 4,563,803 A | | 1/1986 | Dimoff | |
| 4,821,376 A | | 4/1989 | Sandberg | |
| 4,996,743 A | | 3/1991 | Janssen | |
| 5,149,298 A | * | 9/1992 | Lindee | 452/174 |
| 5,382,149 A | | 1/1995 | Yates et al. | |
| 5,549,138 A | * | 8/1996 | Eminger | 137/876 |

(Continued)

OTHER PUBLICATIONS

International Searching Authority, International Search Report and Written Opinion for PCT/US13/21195, Date of Mailing Jul. 19, 2013, 19 pgs.

Primary Examiner — Charles Freay
(74) Attorney, Agent, or Firm — Klintworth & Rozenblat IP LLC

(57) ABSTRACT

Dual foods pump arrangement that includes a pump manifold, two food pumps, and a rotary valve element removably located within the manifold. The rotary valve element is operated to selectively direct the flow of food product from the two food pumps in alternating fashion through a single manifold outlet. The food pumps are driven by servo actuated cylinders. A tool is provided for lifting the valve element from the manifold that includes a pivotal removal bar that can be attached to a top of the valve element.

13 Claims, 18 Drawing Sheets

(56) References Cited

U.S. PATENT DOCUMENTS

| | | |
|---|---|---|
| 7,255,554 B2 | 8/2007 | Lamartino et al. |
| 7,534,074 B2 * | 5/2009 | Kato .............................. 406/183 |
| 2005/0074515 A1 | 4/2005 | Hansen et al. |
| 2008/0233226 A1 | 9/2008 | Taylor et al. |

* cited by examiner

PUMP SYSTEM FOR FOOD MACHINE

This application claims the benefit of U.S. Provisional Application 61/586,481 filed Jan. 13, 2012.

BACKGROUND OF THE INVENTION

Food material pumps using overlapping, alternating plungers that pressurize alternating supplies of food material are known.

Food processors utilize high-speed molding machines, such as FORMAX® MAXUM700®, F-6™, F-12™, F-19™, F-26™, or F-400™ reciprocating mold plate forming machine, available from Formax, Inc. of Mokena, Ill., U.S.A., for supplying patties to the fast food industry. High-speed molding machines are also described for example in U.S. Pat. Nos. 3,887,964; 4,372,008; 4,356,595; 4,821,376; 4,996,743, and 7,255,554.

The FORMAX® F-26™ reciprocating mold plate forming machine has enjoyed widespread commercial success for many years. A typical FORMAX® F-26™ molding machine can operate at 90 strokes per minute and produce about 32,400 patties per hour based on the standard width mold plate for the F-26™ which is about 27 inches wide and can include 6 mold cavities.

The FORMAX® F-26™ molding machine is generally described in U.S. Pat. Nos. 3,887,964; 4,356,595 and 4,996,743. The FORMAX® F-26™ includes a supply system for supplying a moldable food material, such as ground beef, fish, or the like, to the processing mechanisms of the machine. The supply system comprises a large food material storage hopper that opens into the intake of a food pump system. The food pump system includes at least two food pumps that continuously pump food, under pressure, into a manifold connected to a cyclically operable molding mechanism.

In the operation of a FORMAX® F-26™ patty-forming machine, a supply of ground meat or other moldable food material is disposed into the hopper from overhead. The floor of the hopper comprises a conveyor belt for moving the food material longitudinally of the hopper toward the other components of the food material supply system.

At the forward end of the hopper the food material is fed downwardly by the supply system into the intake of the reciprocating pumps constituting the pumping system. The pumps operate in overlapping alteration to each other; at any given time when the machine is in operation at least one of the pumps is forcing food material under pressure into the intake of the manifold.

The manifold comprises a valving system for feeding the food material, still under relatively high pressure, into the molding mechanism. The molding mechanism operates on a cyclic basis, first sliding a multi-cavity mold plate into receiving position over the manifold and then away from the manifold to a discharge position wherein a knock out system removes the molded products from the mold cavity.

The molding mechanism further comprises a knockout system. The knockout system comprises knockout cups, which are affixed to a carrier bar that is removably mounted upon a knockout support member. The knockout cups are coordinated in number and size to the mold cavities in the mold plate; there is one knockout cup aligned with each mold cavity and the mold cavity size is somewhat greater than the size of an individual knockout cup.

Although the FORMAX® F-26™ patty-forming machine includes an integrated overlapping, alternating dual food pumps, the present inventor has recognized the advantages of an improved food pumping system with more flexibility of application that can be incorporated into a food patty molding machine or another food processing machine such as a separator. The present inventor has recognized the need for a pumping system that had a reduced cost of maintenance and a rugged construction.

SUMMARY OF THE INVENTION

A pumping system for a food machine such as a food patty molding machine has two reciprocating food pumps for pumping food product in an alternating fashion. The reciprocating food pumps are located horizontally and adjacent to each other. Each food pump comprises an actuating cylinder connected to a piston rod. The distal end of the piston rod is connected to a plunger. The plunger moves within a pump cavity to receive and push food product into a manifold.

Within the manifold is a valve which alternates between two positions to channel food product from a first pump cavity into the manifold, and to channel food product from a second pump cavity into the manifold. The rotary valve element rotates horizontally between the two positions to receive food product from the food pumps and to channel the food product through the manifold and into a downstream food machine such as into mold cavities. The rotating movement of the rotary valve element is actuated by a linkage system comprising an actuating arm connected to a shaft with which the rotary valve element moves.

The rotary valve element is disposed within the manifold between a fan shaped receiving area which receives food material from each of the pumps, and the manifold outlet. The rotary valve element is supported in position within the manifold by a bottom cover. The top of the rotary valve element is beneath a top cover. Both the bottom and top covers of the rotary valve element are secured to the manifold housing by fastening mechanisms such as screws or bolts.

To remove the rotary valve element from the manifold for cleaning, maintenance, or for other purposes, the top cover is removed to allow the top of the rotary valve element to be accessible. A valve removal tool engages with the top of the pump to form a connection which allows the tool to lift the rotary valve element from its position within the manifold.

Numerous other advantages and features of the present invention will be become readily apparent from the following detailed description of the invention and the embodiments thereof, and from the accompanying drawings.

DESCRIPTION OF THE PREFERRED EMBODIMENT

Figure 1:
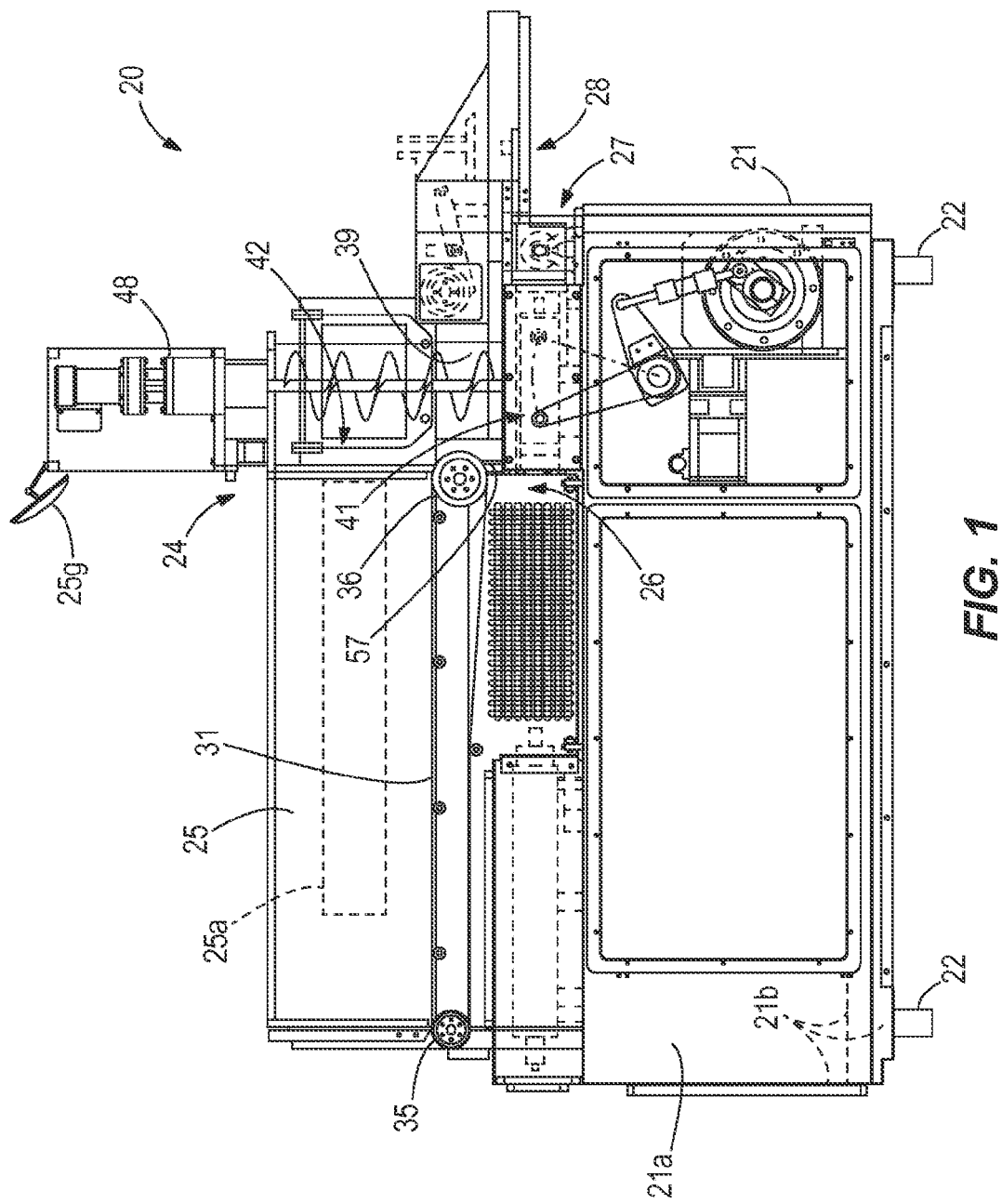
FIG. 1 is a right side elevation view of a prior art high speed food patty molding machine which can be used with the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 3:
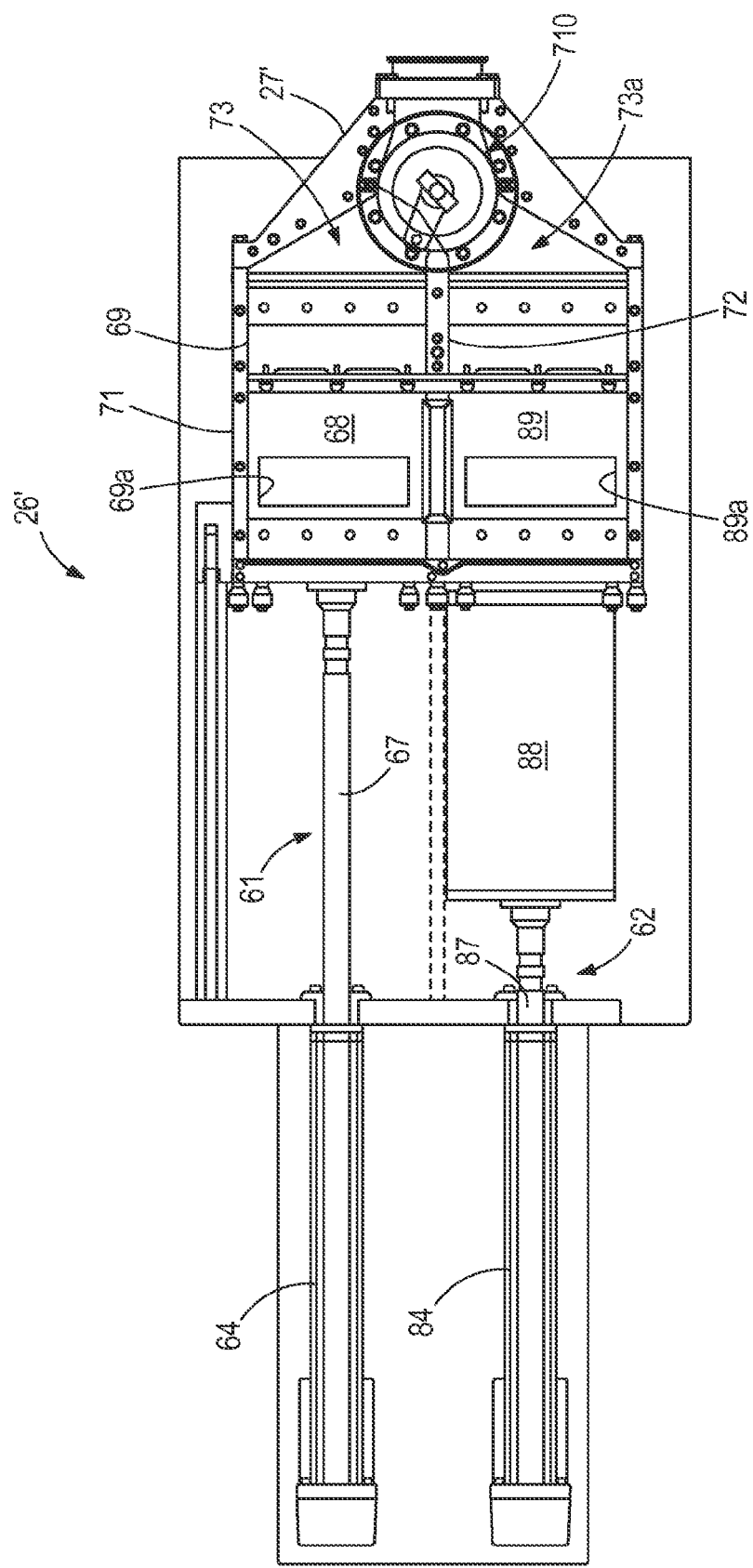
FIG. 3 is a top view of one exemplary embodiment of the pump system.

The directions "left" side and "right" side of the patty-forming machine are according to the convention shown in FIG. 3.

The General Organization and Operation of the Patty Molding Machine

Figure 2:
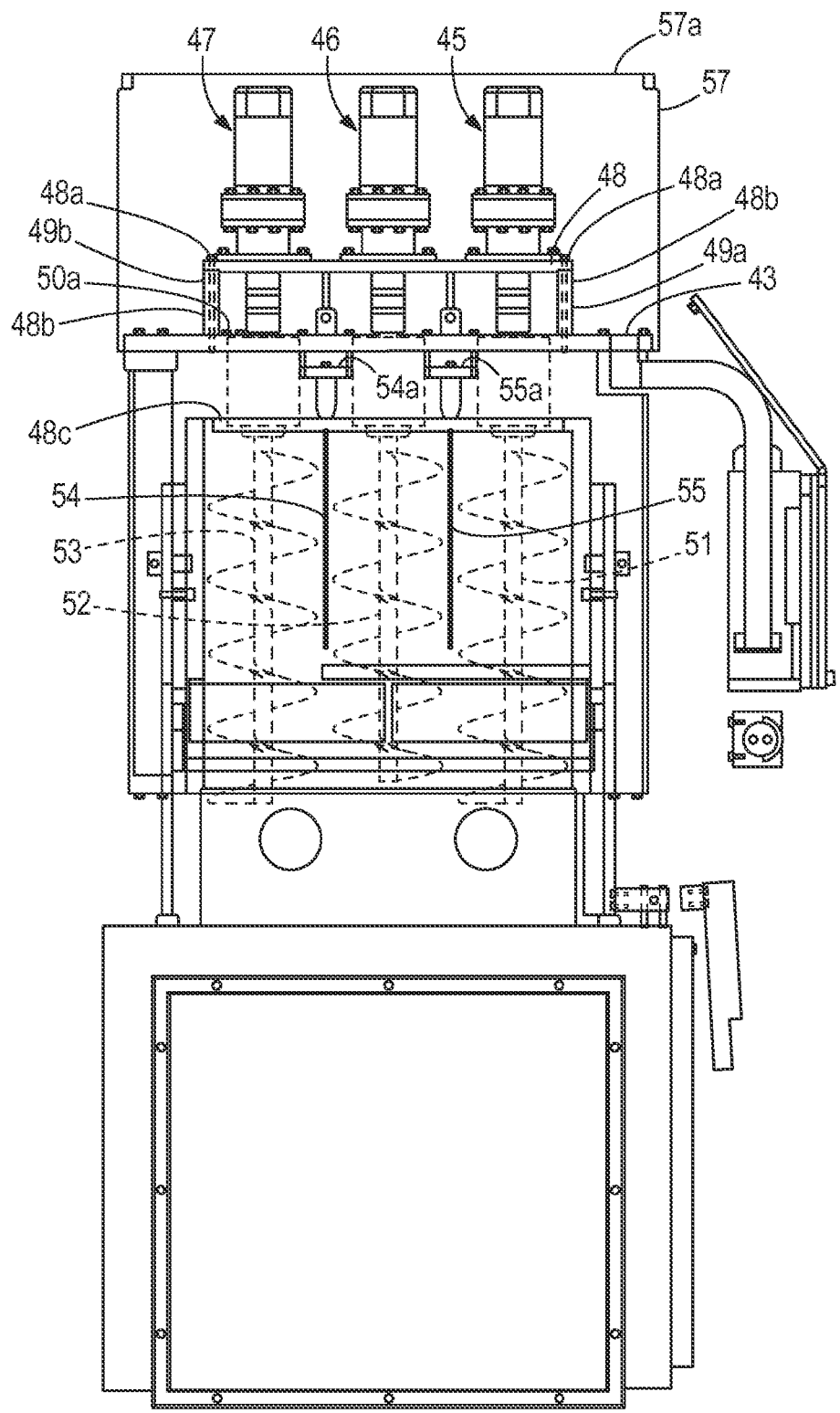
FIG. 2 illustrates the supply apparatus for supplying moldable food material from the hopper to the pumps of the prior art patty molding machine.

A high speed food patty molding machine 20 is illustrated in FIGS. 1 and 2. The FORMAX® F-26™ patty-forming machine is generally described in U.S. Pat. No. 3,887,964 (RE 90,036), U.S. Pat. No. 4,356,595 and U.S. Pat. No. 4,996,743. These patents are herein incorporated by reference to assist in the understanding of the basic operation and configuration of the machine 20, except as modified herein.

As shown in FIG. 1, molding machine 20 includes a machine base 21, preferably mounted upon a plurality of rollers or wheels 22. Machine base 21 comprises an external skin 21a and an internal frame 21b and supports the operating mechanism for machine 20. The base 21 comprises a mechanical compartment that contains hydraulic actuating systems, electrical actuating systems, and most of the machine controls.

Molding machine 20 includes a supply system 24 for supplying a moldable food material, such as ground beef, fish, or the like, to the processing mechanisms of the machine. As generally illustrated in FIG. 1 supply system 24 comprises a large food material storage hopper 25 that opens into the intake of a food pump system 26. The exterior surface of the storage hopper has a hygienic logo 25a permanently etched into stainless steel surface. The food pump system 26 includes at least two food pumps that continuously pump food, under pressure, into a manifold 27 connected to a cyclically operable molding mechanism 28. Molding mechanism 28 can be provided with an elevator system for use in changing the molding mechanism from one product to another, as described in detail.

In the operation of machine 20, a supply of ground meat or other moldable food material is disposed into hopper 25 from overhead. The floor of hopper 25 comprises a conveyor belt 31 for moving the food material longitudinally toward the other components of the food material supply system 24. An elevated mirror 25g allows operating personnel to view inside the hopper 25.

At the forward end of the hopper 25, as seen in FIG. 1, the food material is fed downwardly by the supply system 24 into the intake of the reciprocating pumps constituting pumping system 26. The pumps of system 26 operate in overlapping alteration to each other; at any given time when machine 20 is in operation at least one of the pumps is forcing food material under pressure into the intake of manifold 27.

The manifold 27 comprises a valve system for feeding the food material, still under relatively high pressure, into the molding mechanism 28. Molding mechanism 28 operates on a cyclic basis, first sliding a multi-cavity mold plate into receiving position over manifold 27 and then away from the manifold to a discharge position aligned with a series of knockout cups as described in U.S. Patent Application Publication No. 2008/0233226, herein incorporated by reference.

Infeed Conveyor

The food supply system 24 and associated hopper 25 are illustrated in FIG. 1. Conveyor belt 31 extends completely across the bottom of hopper 25, around an end roller 35 and a drive roller 36, to convey food towards the forward end of the hopper and the vertical pump feed opening.

The drive roller 36 can comprise a sealed drum motor. The sealed drum motor is located inside the roller. Such drum rollers are available from ITOH DENKI. The use of a drum motor eliminates the need for chains and sprockets such that the roller could be driven from the machine motor. Furthermore, the use of a drum motor allows the drive to be more effectively sealed since only an electrical connection need be connected.

Feed Screw System

The forward end of hopper 25 communicates with a vertical pump feed opening 39 that leads downwardly into a pump intake chamber 41. An inverted U-shaped frame 42 is mounted on machine base 21, extending over hopper 25.

As shown in FIG. 2, three electric feed screw drives 45, 46 and 47 are mounted upon a motor mount plate 48 that is mounted to and above the support plate 43 by long bolts 48a and end walls 49a, 49b. The plate 43 includes tapped holes to engage the bolts 48a. Bolts 50a and sleeves 48b extend down from the support plate 43 to hold a cover or shield 48c around and above the feed screws 51-53. The feed screw drives 45, 46, 47 may be compact, integrated electric motor/gearbox assemblies such as SUMITOMO model #CNVMO5-6100YC.-35, 0.5 horsepower.

Drive 45 drives a feed screw 51 that extends downwardly through opening 39 in alignment with a pump plunger. Drive 46 drives a centrally located feed screw 52, whereas drive 47 drives a third feed screw 53, located at the opposite side of hopper 25 from screw 51 and aligned with another pump plunger.

The feed screws 51, 52, 53 include heavy wall thickness flights of about 0.25 inches.

The drives 45-47 are substantially identical and the feed screws 51-53 are substantially identical.

The feed screw system as illustrated in FIG. 2 is enclosed in a one piece stainless steel feed screw drive enclosure 57. The support plate 43 is placed within the enclosure 57 as part of the assembly. A cover 57a is fastened onto the enclosure 57.

The feed screw system can comprise two independent level sensing elements 54, 55 extending downwardly from shafts 54a, 55a as shown in FIG. 2. The level sensing elements are pneumatically biased and configured as described in U.S. Pat. No. 7,255,554, herein incorporated by reference.

When machine 20 is in operation, the feed screw drives 45 and 46 are energized whenever plunger is withdrawn, so that feed screws 51 and 52 supply food product from hopper 25 downwardly through opening 39 and into one side of the intake 41 of the food pumping system 26. Similarly, drives 46 and 47 actuate feed screws 52 and 53 to feed meat to the other side of intake 41 whenever plunger is withdrawn. In each instance, the feed screw drives are controlled to shut off shortly after the plunger is fully retracted, avoiding excessive agitation of the meat. As the supply of food material in the outlet 39 of hopper 25 is depleted, conveyor belt 31 continuously moves the food forwardly in the hopper and into position to be engaged by feed screws 51-53. If the level of meat at the outlet end 39 of hopper 25 becomes excessive, conveyor 31 is stopped, as described above, until the supply at the hopper outlet is again depleted. The wall of the hopper outlet 39 immediately below conveyor drive roller 36 comprises a belt wiper blade 57 that continuously engages the surface of belt 31 and prevents leakage of the meat or other food material from the hopper at this point.

The Food Pump System

A new pump system 26' is illustrated in FIGS. 3 to 18. This pump system 26' can be a stand-alone unit that is connected as desired to another downstream food processing machine such as a separator, or incorporated into a forming machine such as the machine 20 shown in FIGS. 1 and 2.

Figure 4:
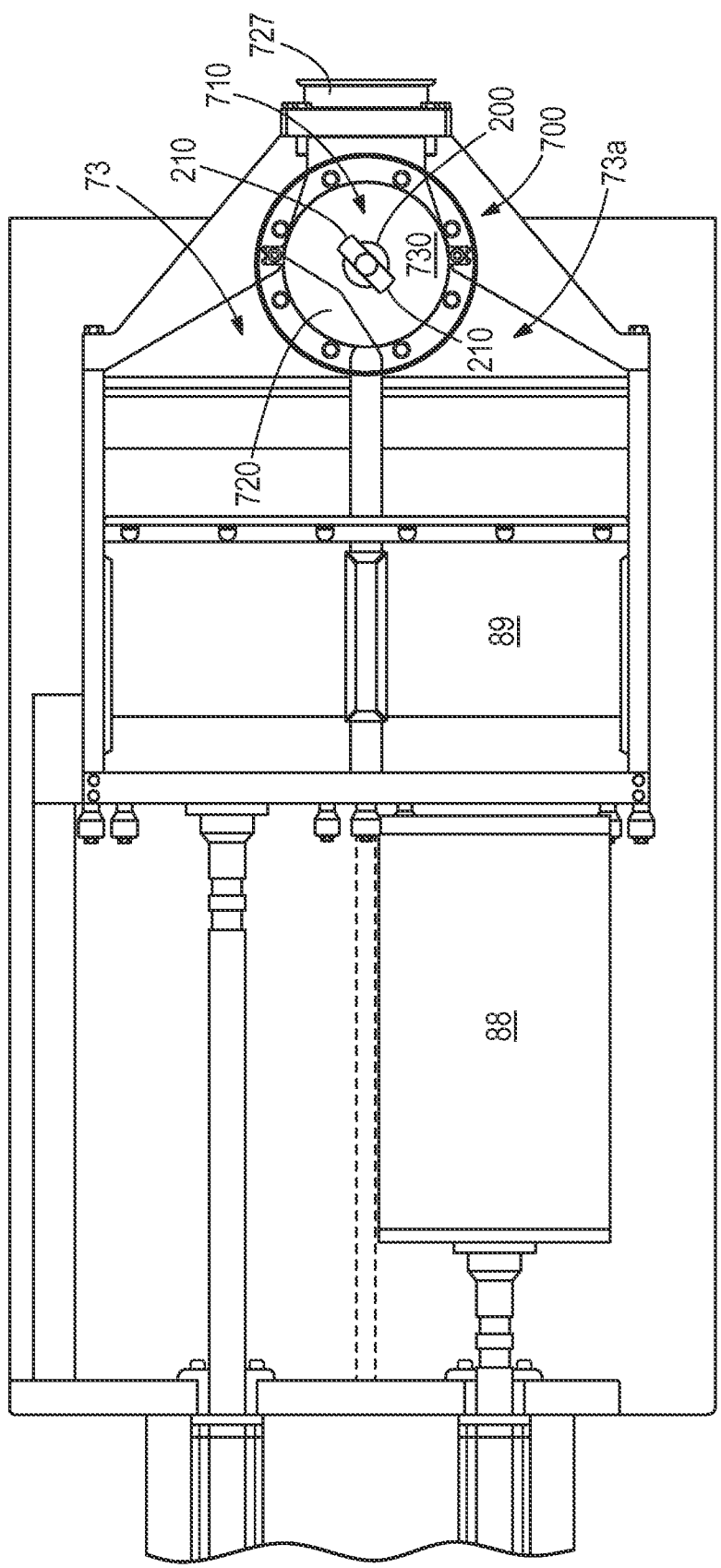
FIG. 4 is an enlarged view of parts of FIG. 3.

As shown in FIGS. 3 and 4, pump system 26' comprises two reciprocating food pumps 61 and 62 mounted upon the top of machine base 21. The first food pump 61 includes a servo actuated cylinder 64. A piston (not shown) in cylinder 64 is connected to an elongated piston rod 67; the distal end of piston rod 67 is connected to a large plunger 68. Plunger 68 is aligned with a first pump cavity 69 formed by a pump cavity enclosure 71 that is divided into two chambers by a central divider wall 72. The pump cavity has an outlet which allows food material to flow into a receiving channel 73 of a manifold 27'.

The second food pump 62 is essentially similar in construction to pump 61 and comprises a servo actuated cylinder 84. Cylinder 84 has a piston rod 87, shown in its retracted position, connected to a large plunger 88 that is aligned with a second pump cavity 89 in housing 71. The pump cavity has an outlet which allows food material to flow into a receiving channel 73a of manifold 27'.

Figure 5:
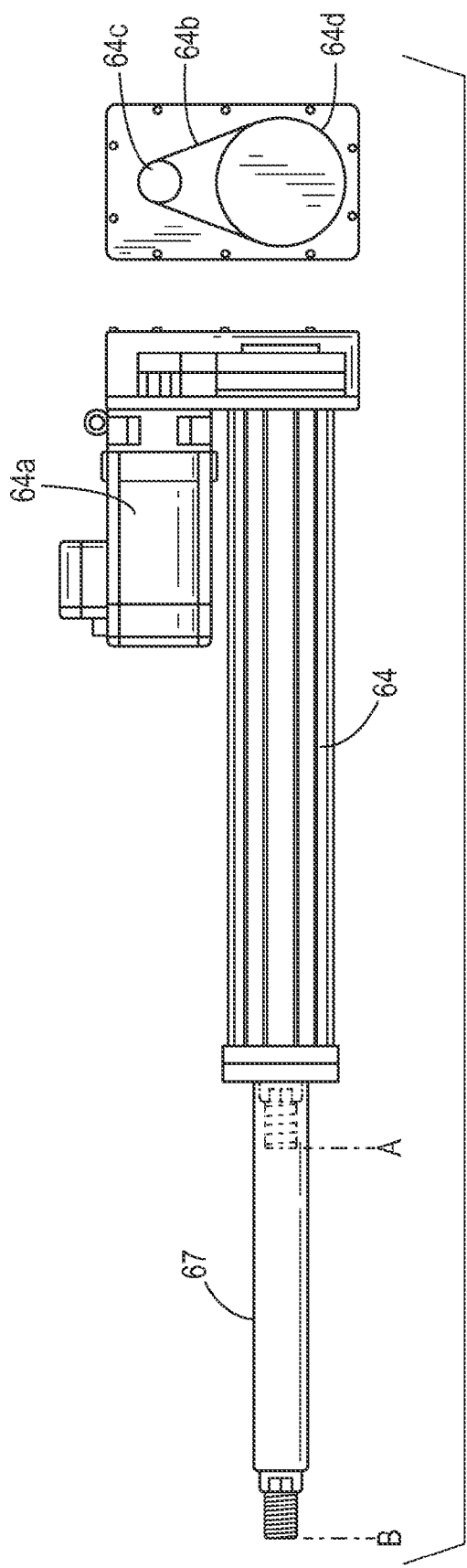
FIG. 5 is a side view of the actuating cylinder for the pump system.

FIG. 5 illustrates one of the servo actuated cylinders 64. Piston rod 67 is shown in its extended position ("B"), and retracted position ("A"). A motor 64a drives the actuating cylinder 64. A drive belt 64b is coupled to a toothed gear 64d of the motor 64a, and a toothed gear 64d of the actuating cylinder such that rotation of the gear 64c causes the gear 64d to rotate in a corresponding rotation to retract or extend the piston rod 67.

In FIGS. 3 and 4, the pumping system 26' is illustrated with the first pump 61 compressing food material to the desired pressure prior to pumping the moldable food material into manifold 27', and with the second pump 62 ready to receive a supply of the moldable food material for a subsequent pumping operation. The supply can be though an opening 89a in the top of the cavity 89, such as the vertical pump feed opening 39, described above with respect to the embodiments of FIGS. 1 and 2. A hopper and feed screws for holding and transferring food material down into the pump cavity, such as described above with respect to the embodiments of FIGS. 1 and 2, can also be associated with the pumping system 26'. Alternately, other methods of refilling the pump cavities are incorporated by the invention.

Pump 61 has begun its pumping stroke, and is compressing the food product in pump cavity 69 by pressing the food material against the closed valve, in anticipation of forcing the moldable food material into the receiving channel when the valve is opened.

When the valve 710 is rotated into its open position, the food product in the pump cavity 69 passes through the receiving channel 73, past the open region 730 of the valve, and through the manifold 27' towards a manifold outlet 727. As operation of pumping system 26' continues, pump 61 advances plunger 68 to compensate for the removal of food material through manifold 27', maintaining a relatively constant pressure on the remaining food in chamber 69.

As plunger 68 advances, servo actuated cylinder 64 senses that plunger 68 is near the end of its permitted range of travel. When this occurs, pump 62 is actuated to advance plunger 88 through pump cavity 89, compressing the food material in the second pump cavity in preparation for feeding the food from that cavity into manifold 27'. When the rotary valve element is in a position to allow the contents in a pump cavity 69 to pass through the manifold, the rotary valve element is also in a position to prevent the contents of pump cavity 89 from passing through the manifold, thus allowing the contents of pump cavity 89 to be compressed due to a buildup of pressure.

When the food in the second pump cavity 89 is under adequate pressure, the input to manifold 27' is modified so that subsequent feeding of food product to the manifold is effected from the second pump cavity 89 with continuing advancement of plunger 88 of the second pump 62. After the manifold intake has been changed over, pump 61 is actuated to withdraw plunger 68 from cavity 69 and to allow the pump cavity 69 to be once again filled with food product through top opening 69a. The manifold intake is changed over using a rotary valve system which is discussed in further detail below.

Thereafter, when plunger 88 nears the end of its pressure stroke into pump cavity 89, pumping system machine control transfers pumping operations to pump 61 again. The changeover process described immediately above is reversed; pump 61 begins its compression stroke, manifold 27' is changed over for intake from pump 61, and pump 62 subsequently retracts plunger 88 back to the supply position shown in FIGS. 3 and 4 to allow a refill of pump cavity 89. This overlapping alternating operation of the two pumps 61 and 62 continues as long as the pumping system 26' is in operation.

The Manifold and Rotary Valve System

Figure 6:
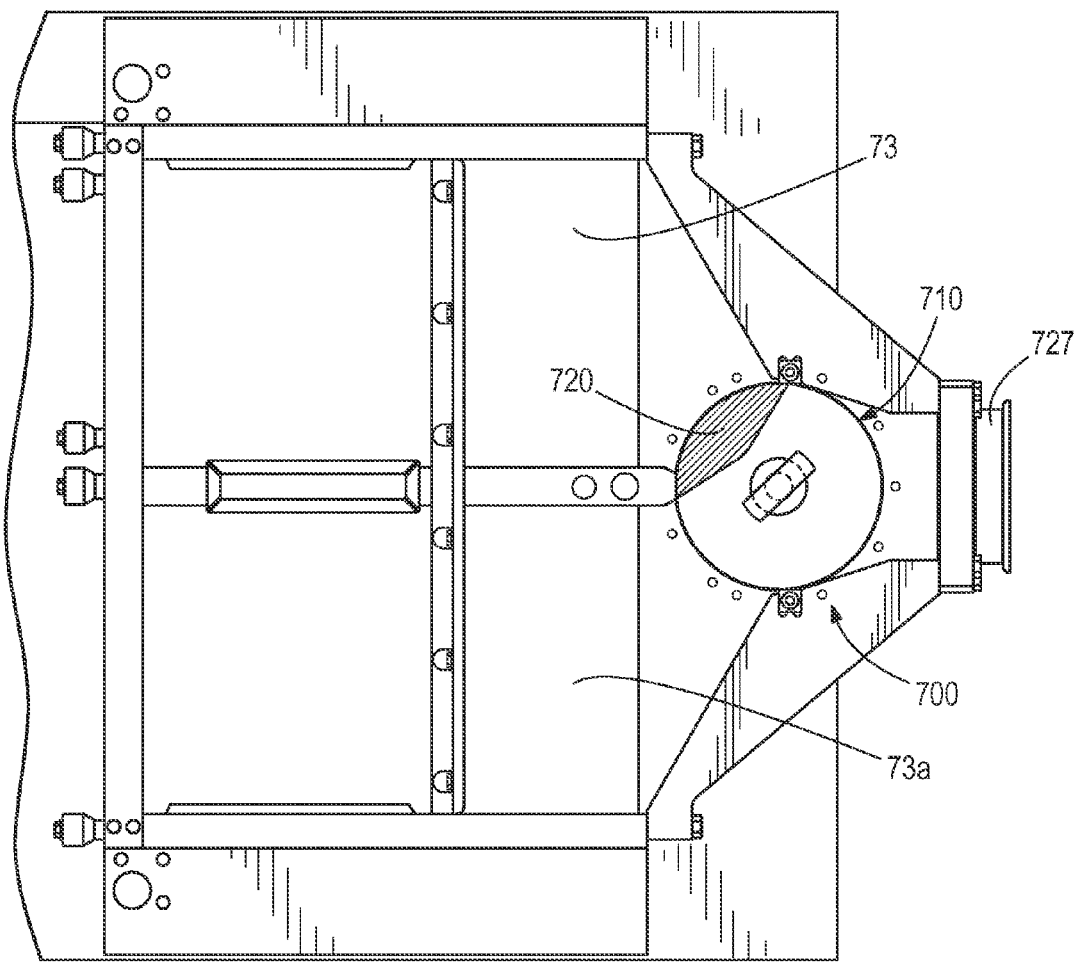
FIG. 6 is a top view of the rotary valve element of the pump system.
Figure 7:
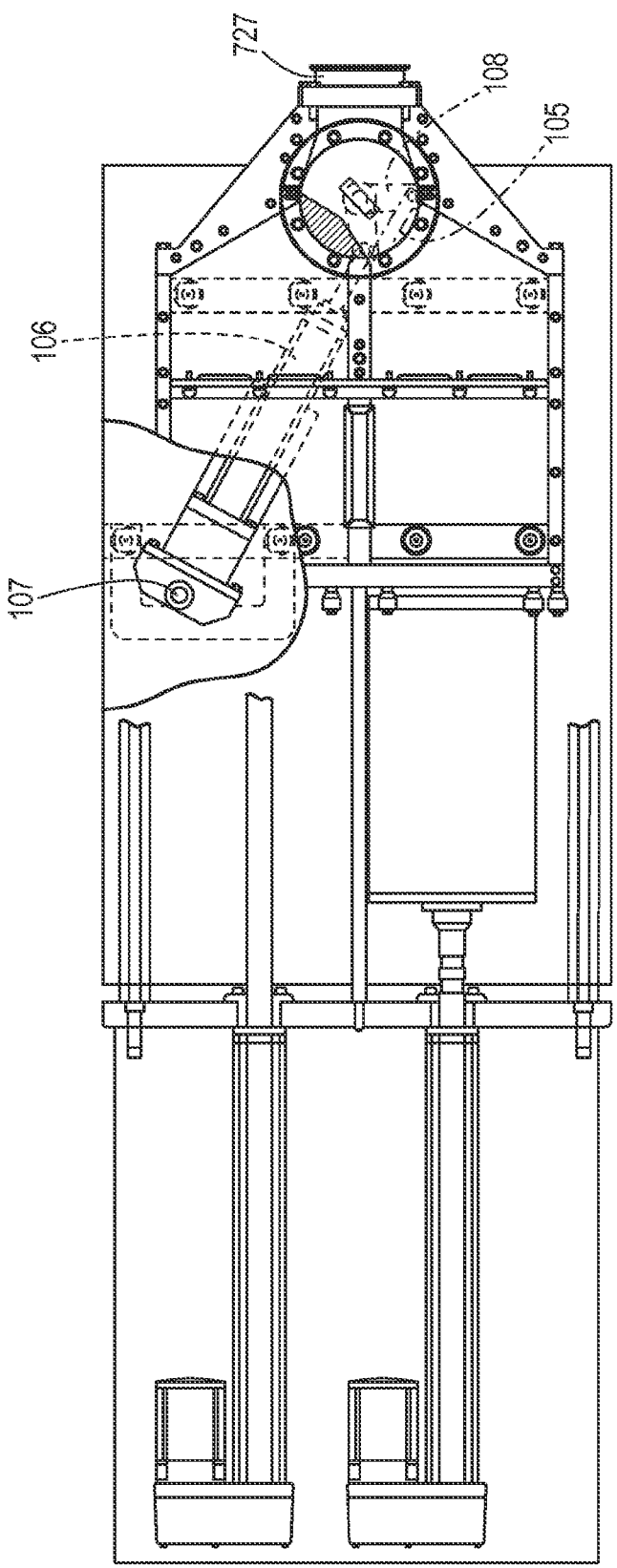
FIG. 7 is a top view of actuating mechanism of the rotary valve element.

The pump manifold 27', shown in FIGS. 3, 4, and 7 comprises a rotary valve system 700 (FIG. 6). The rotary valve system 700 comprises a rotary valve element 710 which is disposed within a fan shaped manifold 27. The rotary valve element 710 rotates within the manifold 27' to direct the flow of food product from pump cavity 69, 89 to the manifold outlet 727. The rotary valve element comprises a solid portion 720 and an open region 730. Rotation of the solid portion 720 into the first receiving channel 73 closes off communication between the first pump cavity 69 and the manifold outlet 727, thus preventing the food product in the first pump cavity 69 from flowing into the pump manifold 27. The extension of the plungers into the pump cavity while the solid portion 720 is turned toward the pump cavity allows the pressure to increase in the pump cavity to the desired level. When the solid portion 720 is within the first receiving channel 73, the open region 730 is in communication with the second pump cavity 89, which allows the food product in the second pump cavity to flow into the manifold outlet 727. Once food product in the first pump cavity 69 reaches the desired level, the valve element is rotated such that the open region 730 is in communication with the first pump cavity, and the solid portion 720 is in position to allow the food product in the second pump cavity 89 to be compressed against it.

Figure 8:
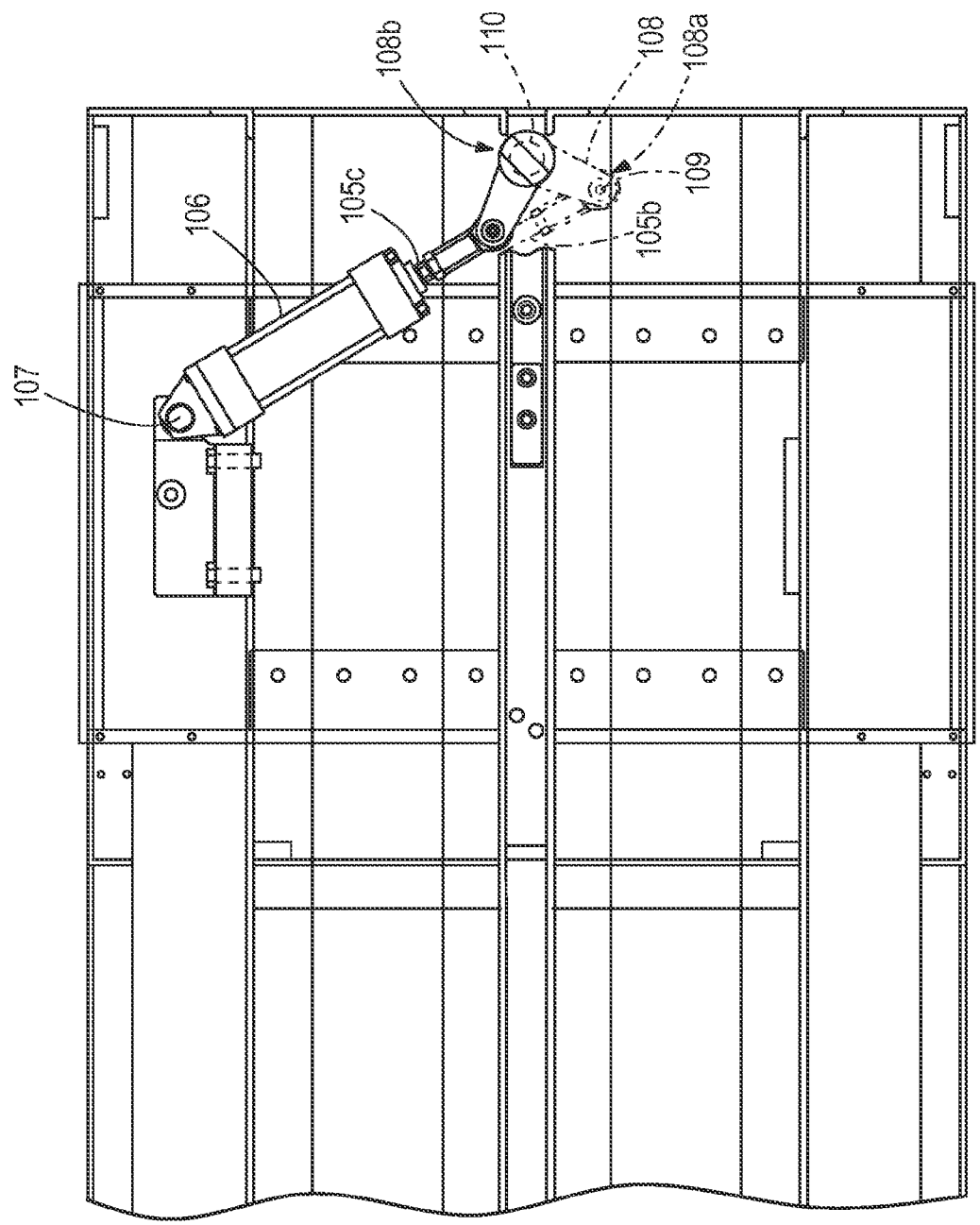
FIG. 8 is an enlarged view of the actuating mechanism of FIG. 7 with the rotary valve element removed for clarity.

When pumping system 26' changes over between pump 61 and pump 62, the input into the manifold 27 is accordingly changed to receive food product from pump 62. The rotational position of the rotary valve element 710, is actuated to its alternate operating conditions by actuator 106 (FIGS. 7 and 8). Actuator 106 retracts and extends piston rod 105, to rotate the rotary valve element 710. On one end 106a, the actuator 106 is pivotally connected to a pin 107 (FIGS. 7 and 8). Extending from the actuator is a piston rod which is connected to a coupling member 105a which joins to the linkage member 108.

Figure 9:
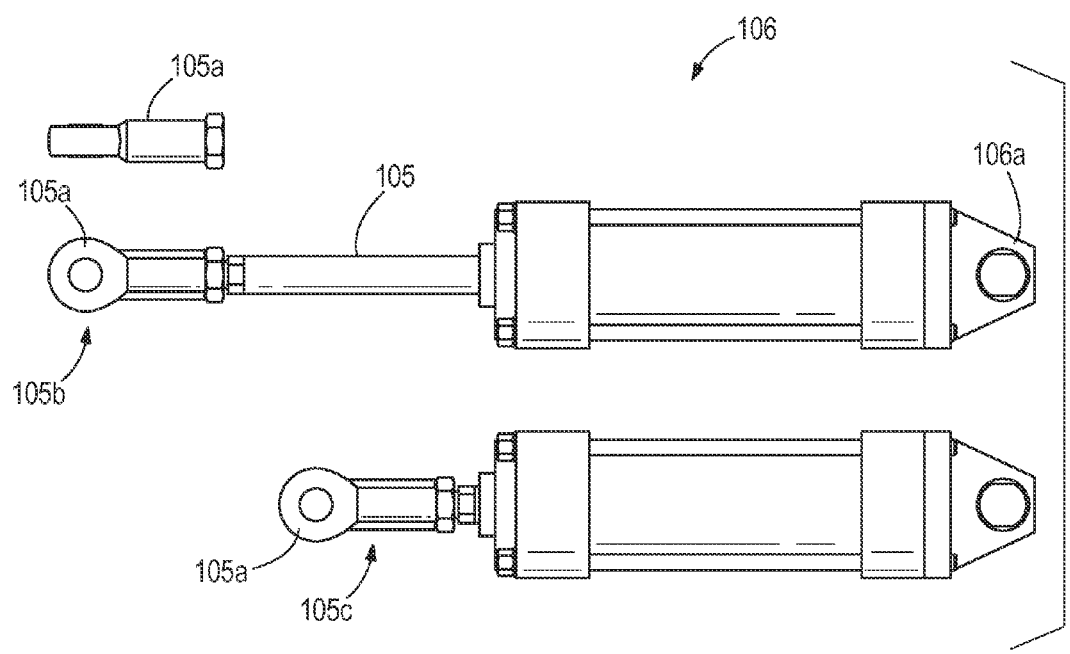
FIG. 9 illustrates the actuator for the rotary valve element.
Figure 10:
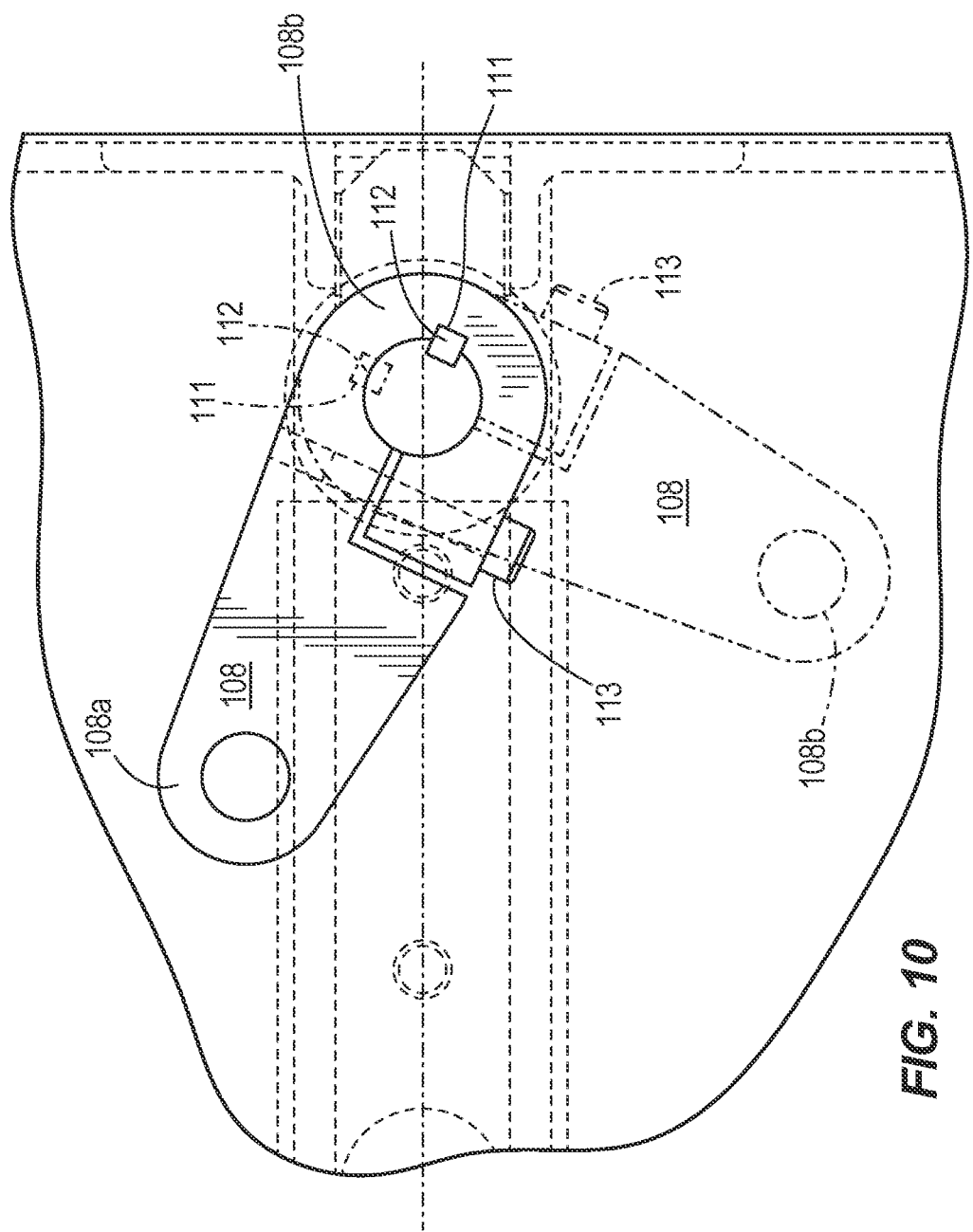
FIG. 10 is a top view of the linkage member.

FIGS. 8 and 9 illustrate the piston rod 105 in its extended 105b and retracted 105c states. Linkage member 108 has an actuator connection end 108a, and a rotary valve shaft connection end 108b (FIG. 10). The linkage member 108 is connected to the actuator 106 at the actuator connection end 108a by a pin 109 which extends through hole 108b and coupling member 105a to allow the linkage member and the piston rod 105 to pivot relative to each other as illustrated in FIG. 8. The linkage member 108 is connected to the rotary valve element at the rotary valve connection end 108b by a rigid connection to a shaft 110 (FIG. 11).

Figure 11:
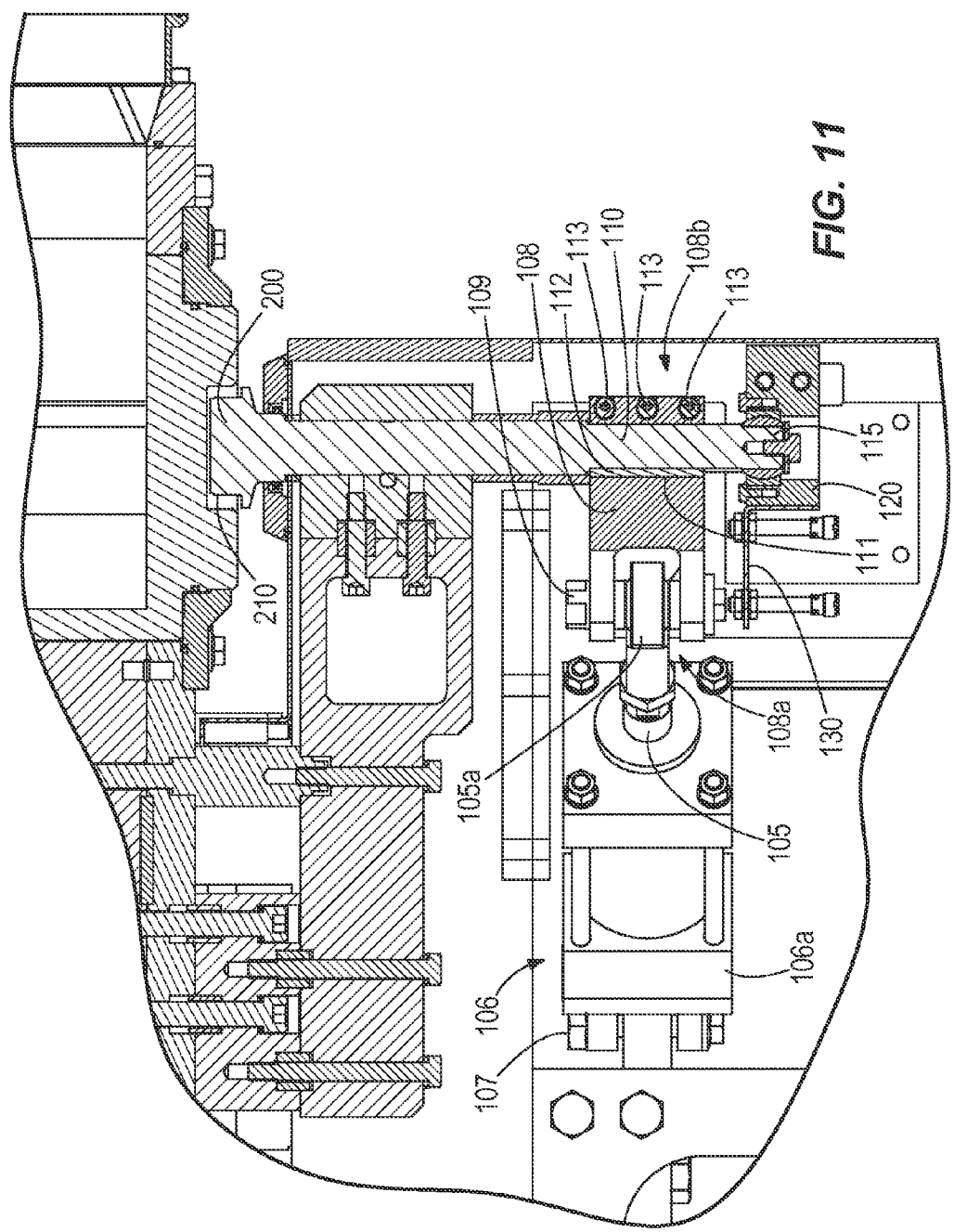
FIG. 11 is a side view of the linkage system.
Figure 12A:
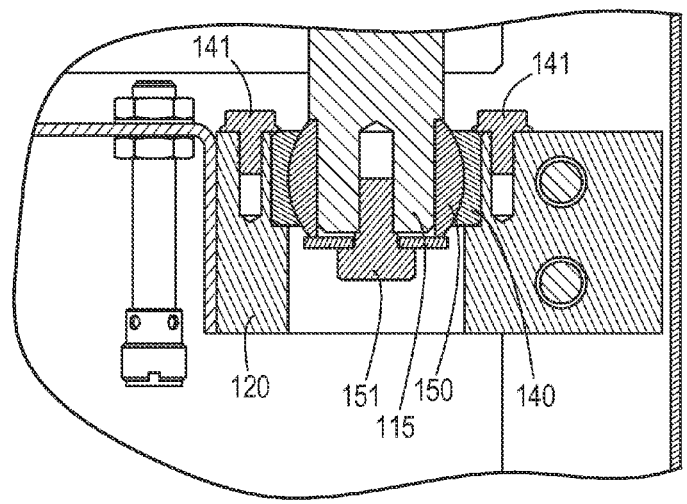
FIGS. 12A to 12E illustrate various views of the bottom of the shaft secured to the molding machine.
Figure 12B:
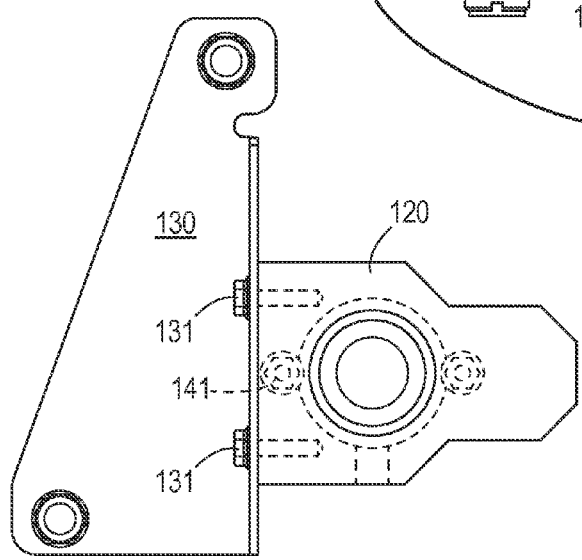
Figure 12E:
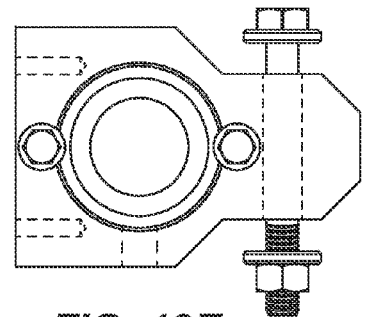
Figure 12C:
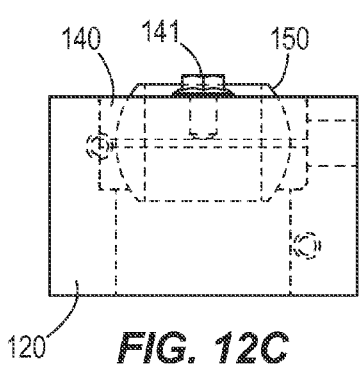
Figure 12D:
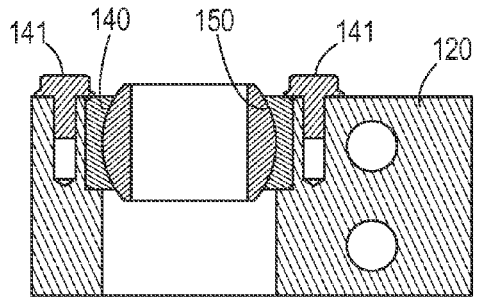
Figure 13:
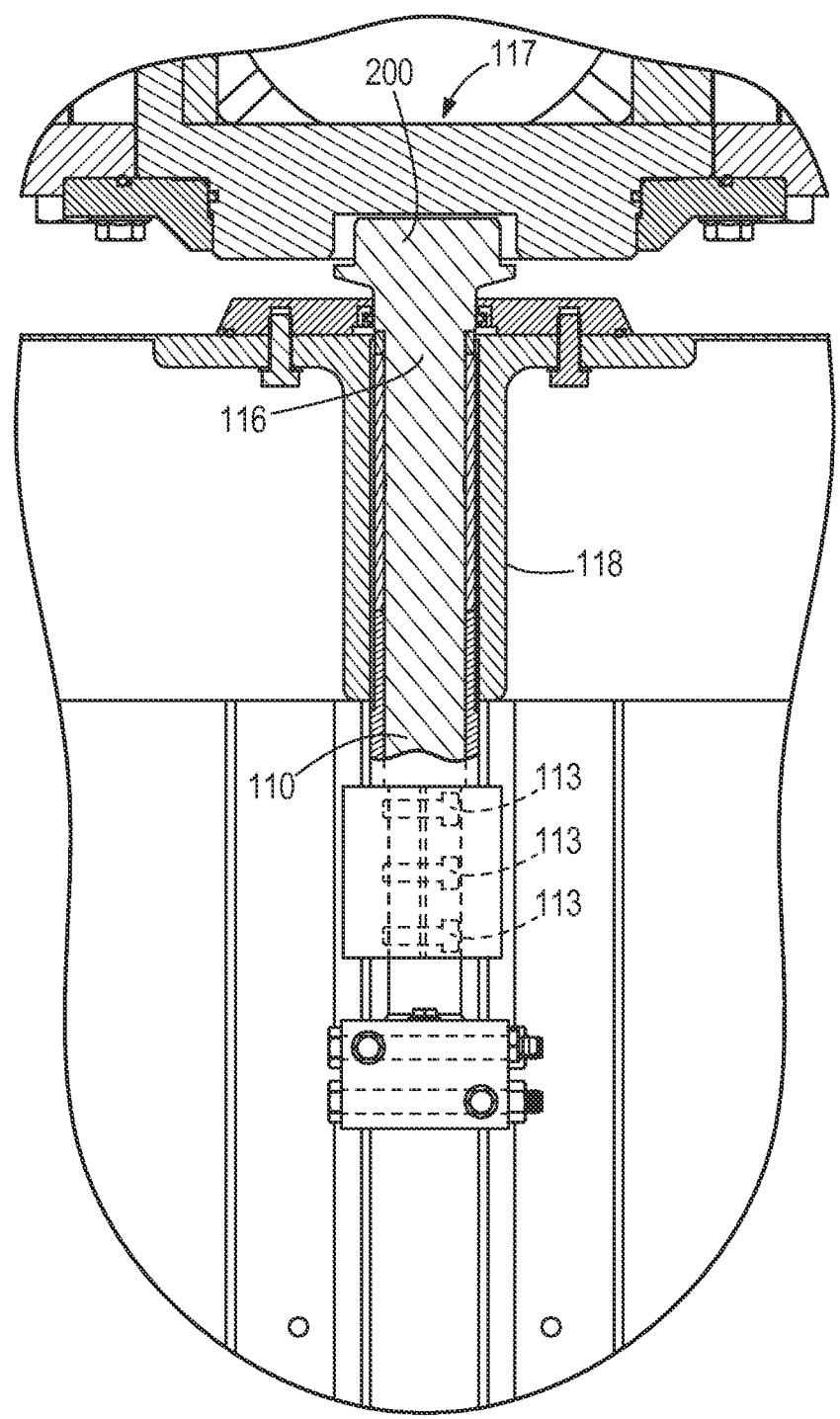
FIG. 13 is an enlarged side view of the top portion of the shaft.

As illustrated in FIGS. 10 and 11, the rotary valve connection end 108b of the linkage member 108 has a longitudinal groove 111 along the height of the linkage member 108 which is keyed to receive a protrusion 112 from the shaft 110. The protrusion 112 allows the shaft to rotate with the linkage member 108 such that rotational movement of the linkage member 108 as a result of the extension or retraction of the actuator 106, rotates the shaft 110. The linkage member 108 is secured to the shaft 110 by surrounding the shaft 110 and is tightened about the shaft using fastening mechanisms such as screws 113 (FIG. 11).

The shaft 110 extends upwards from a lower machine housing. Within the lower machine housing, the shaft 110 is secured within a receiving member 120 to an attachment plate 130 by bolts 131 (FIGS. 12A-12E). A bearing shaft 140 is disposed within the receiving block 120 to receive the bottom end of the shaft 110. The bearing shaft 140 receives a ball bearing 150 disposed around the bottom end 115 (FIG. 12A) of the shaft. The bearing shaft 140 is held in place by two bolts 141 which are disposed to overlap a portion of the bearing shaft and secure it in position within the receiving member 120. The shaft 110 is then disposed within the bearing 150 and secured to the bearing 150 with a bolt 151. Thus, when the shaft 110 is rotated by the actuating mechanism 106, the shaft 110 is able to pivot about the bearing shaft 140.

The shaft 110 on its top end 116 (FIG. 13) is connected to a rotary valve engagement member 117. The top end 116 of the shaft extends upwards from the lower housing and is received by the rotary valve engagement member 117. The top end 116 of the shaft passes through a bearing block 118 to extend above the lower housing.

Figure 14:
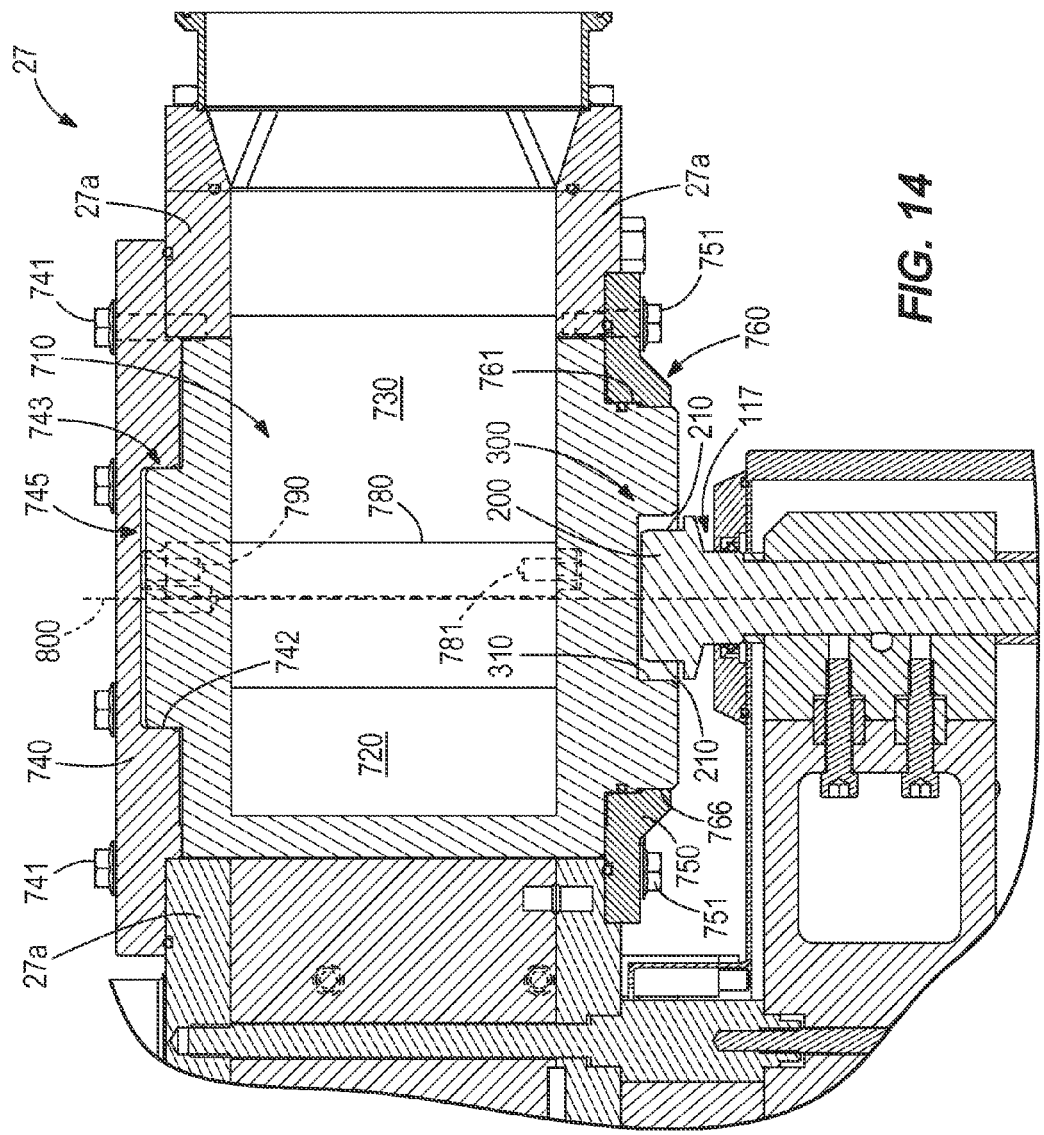
FIG. 14 is a side view of the rotary valve element within the manifold.

As illustrated in FIGS. 4 and 14, the rotary valve engagement member 117 comprises a cylindrical top 200 with a rectangular perimeter extension 210 which extends from either side of the cylindrical top section 200. The cylindrical top section 200 fits within the bottom section 300 of the rotary valve element 710. The bottom section 300 of the rotary valve element has contoured recesses 310 which are snugly complementary in shape to the top of the cylindrical top section 200 and the rectangular perimeter extension 210. The rectangular perimeter extension 210 that is snugly complementary with the contoured recesses 310 in effect key the engagement member 117 to the rotary valve element 710 to force the rotary valve element to move with the movement of the shaft 110.

The manifold 27' wherein the rotary valve element is received comprises a top cover 740 and a bottom cover 750 (FIG. 14). Both the top cover and the bottom cover are secured to the manifold housing 27a by fastening mechanisms such as bolts 741 and 751. The bottom cover receives the bottom section 300 of the rotary valve element. The bottom section of the rotary valve element comprises a stepped section 760 which is circular and smaller in diameter than the diameter of the rotary valve element. The stepped section 760 is disposed in a complementarily shaped recessed section 761 in the bottom cover 750. The bottom cover 750 has an opening 766 which allows the stepped section 760 to extend through the thickness of the bottom cover 750 to receive the cylindrical top 200 and its associated rectangular perimeter extension 210.

The top cover 740 is disposed over the top 745 of the rotary valve element, and has a bottom surface 742 contoured to complementarily receive the stepped top surface of 743 the rotary valve element. The rotary valve element has a support rod 780 which extends between the bottom of the rotary valve element to the top of the rotary valve element. The support rod 780 is disposed off center from a central axis 800 of the rotary valve element. The support rod 780 is secured to the bottom of the rotary valve element by a threaded fastening mechanism 781. The support rod 780 extends to the top of the rotary valve element wherein the top end of the support rod has a threaded bore 790 accessible from the top 745 of the rotary valve element.

The Removal Tool

Figure 15:
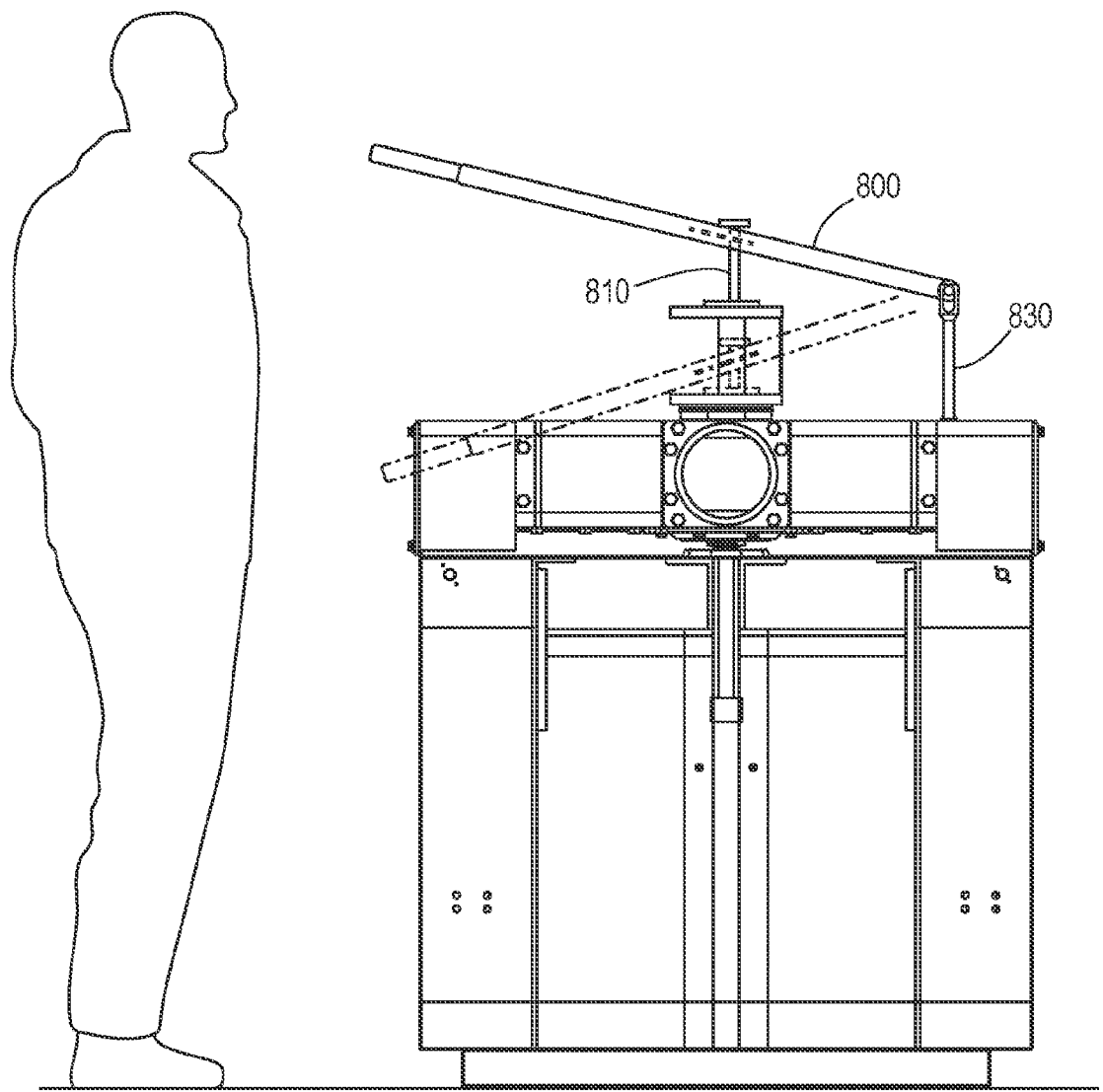
FIG. 15 is a front view of the valve removal tool.
Figure 16:
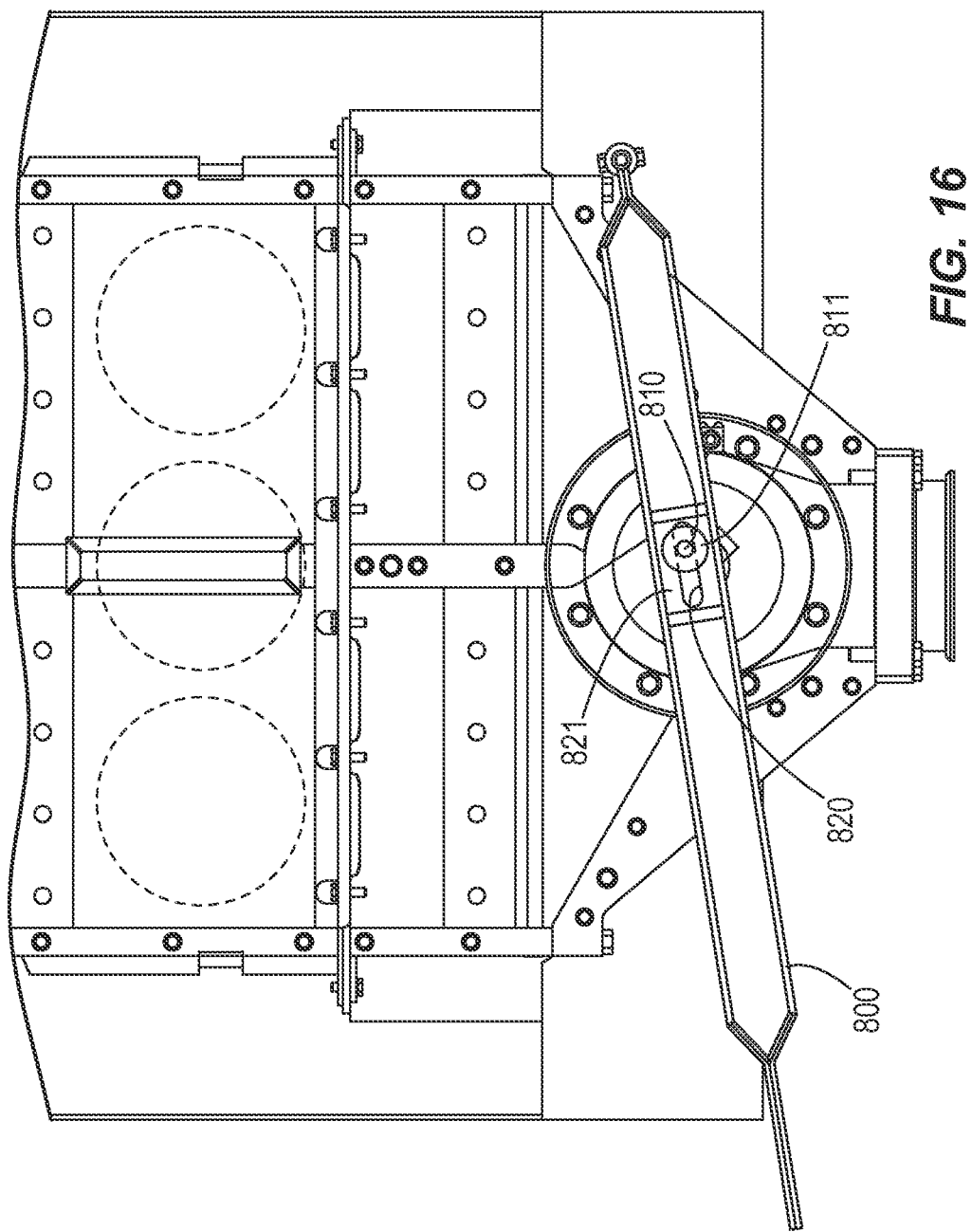
FIG. 16 is a top view of the valve removal tool in position for removal of the rotary valve element.
Figure 17:
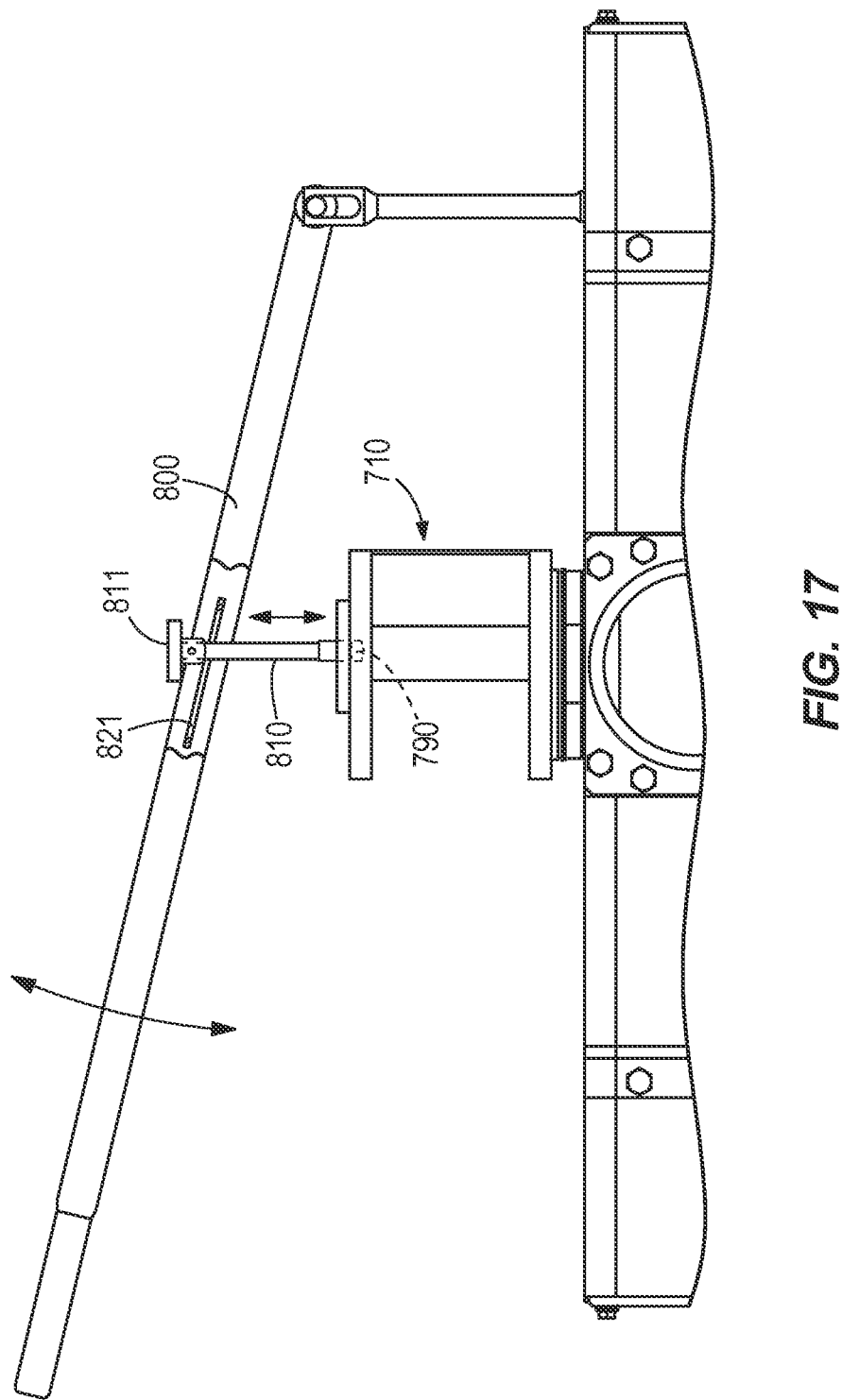
FIG. 17 is an enlarged front view of the valve removal tool removing the rotary valve element.
Figure 18:
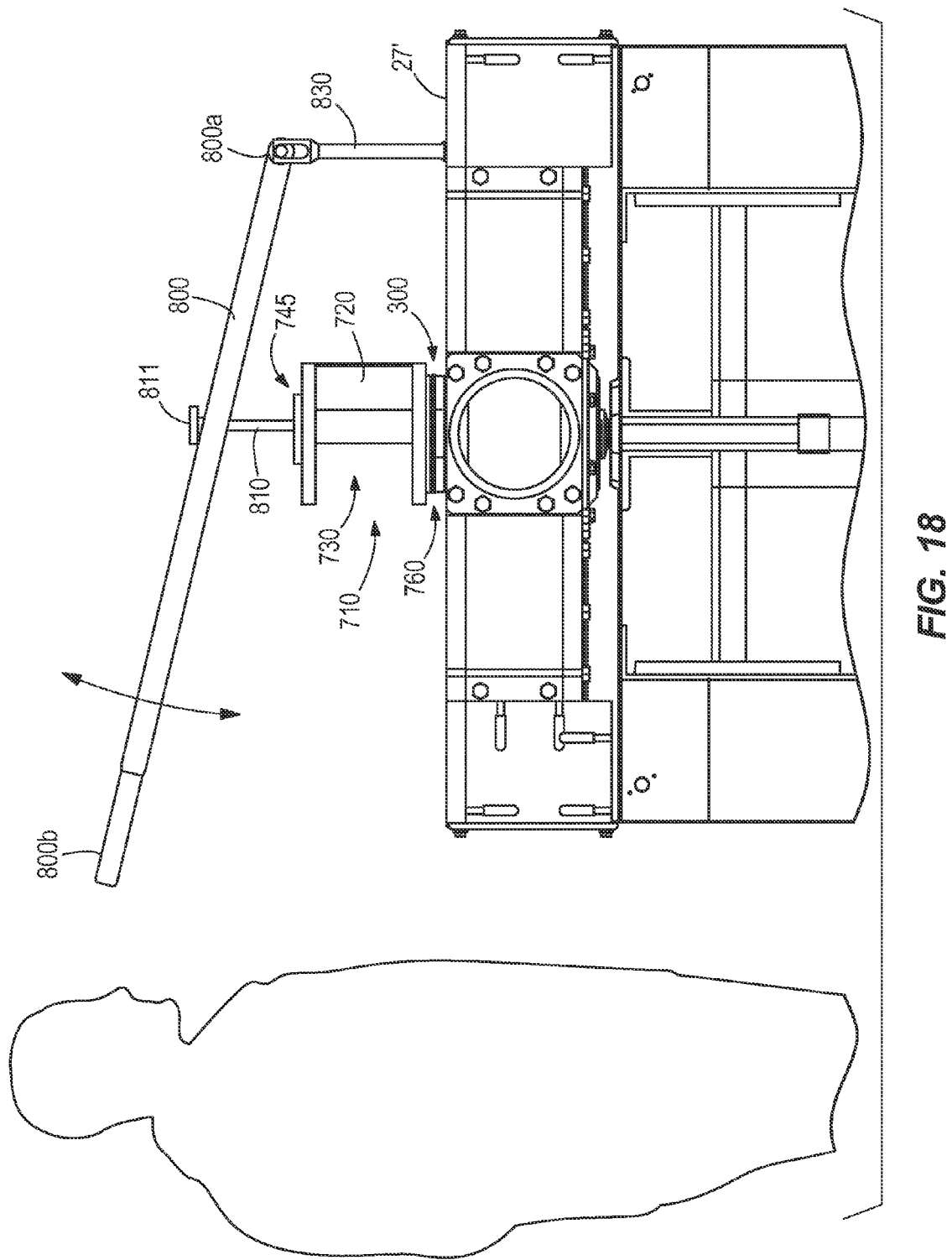
FIG. 18 is a front view of the valve removal tool removing the rotary valve element.

The removal tool as illustrated in FIGS. 15-18 comprises a removal bar 800 and vertical removal rod 810. The removal bar 800 has a plate 821 with a longitudinal slot 820 through which the vertical removal rod 810 is passed. The vertical removal rod 810 has a handle portion 811 which does not pass through the longitudinal slot due to its larger size. The rest of the vertical removal rod 810 is passed through the longitudinal slot 820 and fastened to the threaded bore 790 at the top 745 of the rotary valve element. Once the vertical removal rod 800 is secured to the top 745 of the rotary valve element, the user raises the removal bar 800 to lift up the rotary valve element from its position within the manifold. FIG. 15 illustrates the removal bar in position before and after the rotary valve element is removed. The vertical removal of the rotary valve element from its position within the manifold minimizes the number of parts that need to be removed to access the rotary valve element. Only the cover of the rotary valve element needs to be removed to allow the top surface of the cylindrical valve to be accessible to the removal tool.

The removal bar 800 is pivotally connected at a base end 800a to a vertical support bar 830 which extends from the top surface of the manifold 27'. As the removal bar 830 is lifted at a distal end 800b, a rotational motion about the base end 800a is translated to a vertical lifting motion at the vertical removal rod 810 by the sliding movement of the vertical removal rod 810 within the longitudinal slot 820. To this end the handle portion 811 has a rounded bottom 811a that slides on the plate 821, through the slot 820.

From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein, to the extent that the references are not inconsistent with the present disclosure.

The invention claimed is:

1. A dual food pump arrangement comprising:
   a pump manifold having a first manifold inlet, a second manifold inlet, and a manifold outlet, said manifold outlet being a single nozzle;
   a first food pump within a first pump cavity and a second food pump within a second pump cavity, the first pump cavity having a first outlet open into the first manifold inlet and the second pump cavity having a second outlet open into the second manifold inlet; and
   a rotary valve element disposed within the pump manifold, the rotary valve element rotatable about a substantially vertical axis within the pump manifold to selectively direct the flow of food product through either the first manifold inlet or the second manifold inlet to the manifold outlet;
   wherein the rotary valve element has a support rod which extends between the bottom of the rotary valve element to the top of the rotary valve element, wherein the support rod is disposed off center from the substantially vertical axis.

2. The dual food pump arrangement according to claim 1, comprising an actuator, wherein the rotary valve element is rotated about the substantially vertical axis by the actuator.

3. The dual food pump arrangement according to claim 2 wherein the actuator horizontally retracts or extends a piston rod, to rotate the rotary valve element.

4. The dual food pump arrangement according to claim 2, comprising a linkage member operatively connected at a base end to the rotary valve element and extending radially out from the substantially vertical axis to a distal end, wherein one end of the actuator is pivotally connected to a stationary portion that is stationary with respect to the manifold, and extending from the actuator is a piston rod which is pivotally connected to the distal end of the linkage member, pivoting of the linkage member causing rotation of the valve element.

5. The dual food pump arrangement according to claim 4, comprising a shaft arranged along the substantially vertical axis, the shaft operatively connected to the valve element such that rotation of the shaft causes rotation of the valve element, and wherein the linkage member is rigidly connected to the shaft to rotate the shaft when the linkage member is pivoted.

6. The dual food pump arrangement according to claim 5, wherein the shaft is operatively connected to the valve element by a rotary valve engagement member having a cylindrical top section with a rectangular perimeter extension which extends from either side of the cylindrical top section; the valve element includes a bottom section wherein the cylindrical top section fits within the bottom section of the valve element, wherein the bottom section of the valve element has contoured recesses which are complementary in shape to the top of the cylindrical top section and the rectangular perimeter extension to force the valve element to rotate with the rotation of the shaft.

7. The dual food pump arrangement according to claim 5, wherein the manifold comprises a manifold housing and a top cover and a bottom cover; both the top cover and the bottom cover are secured to the manifold housing by fastening mechanisms;
   the bottom cover receives the bottom section of the rotary valve element; the bottom section of the rotary valve element comprises a stepped section that is disposed in a complementarily shaped recessed section in the bottom cover.

8. The dual food pump arrangement according to claim 7, wherein the bottom cover has an opening which allows the stepped section to extend through the thickness of the bottom cover in order to receive the cylindrical top section and its associated rectangular perimeter extension.

9. The dual food pump arrangement according to claim 7, wherein the top cover is disposed over the top of the valve element, and has a bottom surface contoured to complementarily receive the stepped top surface of the valve element.

10. The dual food pump arrangement of claim 1, wherein said first food pump comprises a first servo actuated cylinder driving a first food pump plunger and the second food pump comprises a second servo actuated cylinder driving a second food pump plunger.

11. The dual food pump arrangement according to claim 10, wherein each of the first and second servo actuated cylinders comprises a piston rod and a motor that drives the actuating cylinder, a drive belt is coupled to a toothed gear of the motor, and a toothed gear of the actuating cylinder such that rotation of the gear causes the gear to rotate in a corresponding rotation to retract or extend the piston rod.

12. The dual food pump arrangement according to claim 10, comprising an actuator, and wherein the rotary valve element is rotated about the substantially vertical axis by the actuator.

13. The dual food pump arrangement according to claim 12 wherein the actuator horizontally retracts or extends a piston rod, to rotate the rotary valve element.

* * * * *